US009929780B2

(12) United States Patent
Abbondanzio et al.

(10) Patent No.: US 9,929,780 B2
(45) Date of Patent: Mar. 27, 2018

(54) CAPTURING PHYSICAL INVENTORY IN A DATA CENTER

(71) Applicant: LENOVO ENTERPRISE SOLUTIONS (SINGAPORE) PTE. LTD., Singapore (SG)

(72) Inventors: Antonio Abbondanzio, Raleigh, NC (US); Patricia M. Genovese, Cary, NC (US); Gregory B. Pruett, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/810,012

(22) Filed: Jul. 27, 2015

(65) Prior Publication Data

US 2017/0033839 A1 Feb. 2, 2017

(51) Int. Cl.
| H04B 5/00 | (2006.01) |
| H04W 4/00 | (2018.01) |
| H04W 64/00 | (2009.01) |
| H04W 76/02 | (2009.01) |

(52) U.S. Cl.
CPC ......... *H04B 5/0056* (2013.01); *H04B 5/0031* (2013.01); *H04W 4/008* (2013.01); *H04W 64/003* (2013.01); *H04W 76/023* (2013.01)

(58) Field of Classification Search
CPC ... H04B 5/0056; H04B 5/0031; H04W 4/008; H04W 64/0003; H04W 76/023
USPC ..................... 455/41.1, 41.2, 41.3
See application file for complete search history.

(56) References Cited

U.S. PATENT DOCUMENTS

| 9,367,195 | B1* | 6/2016 | Rabe ................. G06F 3/048 |
| 2005/0010499 | A1* | 1/2005 | Farkas .............. G06Q 10/08 |
| | | | 705/28 |
| 2010/0235688 | A1* | 9/2010 | Bennah .............. G06F 11/0781 |
| | | | 714/57 |
| 2012/0136698 | A1* | 5/2012 | Kent ................. G06Q 20/3276 |
| | | | 705/14.1 |
| 2013/0346658 | A1* | 12/2013 | DeCesaris ........... G06F 13/4282 |
| | | | 710/110 |
| 2014/0181420 | A1* | 6/2014 | Wicki ................. G06F 12/0831 |
| | | | 711/146 |
| 2014/0253093 | A1* | 9/2014 | Bermudez Rodriguez |
| | | | ................. G06F 1/18 |
| | | | 324/76.11 |
| 2014/0253289 | A1* | 9/2014 | Groth ................. H05K 7/1498 |
| | | | 340/8.1 |
| 2014/0258052 | A1* | 9/2014 | Khuti ................. G06Q 10/087 |
| | | | 705/28 |
| 2014/0330511 | A1* | 11/2014 | Tison ................. G06F 1/1696 |
| | | | 701/428 |

(Continued)

*Primary Examiner* — Md Talukder
(74) *Attorney, Agent, or Firm* — Brandon C. Kennedy; Jason A. Friday; Kennedy Lenart Spraggins LLP

(57) ABSTRACT

Capturing physical inventory in a data center includes: establishing a proximity-based data communications connection with a service processor of a server, the server installed at a location within a server rack; retrieving an identifier of the server via the proximity-based data communications connection; capturing, with a camera of the mobile computing device, a digital image of the server in the server rack; identifying, from the digital image, the location of the server within the server rack; and storing the identified location of the server within the server rack in association with the retrieved identifier.

15 Claims, 4 Drawing Sheets

(56) References Cited

U.S. PATENT DOCUMENTS

| | | | | |
|---|---|---|---|---|
| 2015/0004996 A1* | 1/2015 | Finlow-Bates | ......... | H04W 4/02 455/456.1 |
| 2015/0009013 A1* | 1/2015 | Cartwright | ........... | G06Q 10/087 340/10.1 |
| 2015/0069119 A1* | 3/2015 | Hastman | .............. | G06Q 10/087 235/385 |
| 2017/0033839 A1* | 2/2017 | Abbondanzio | ...... | H04B 5/0056 |

* cited by examiner

CAPTURING PHYSICAL INVENTORY IN A DATA CENTER

BACKGROUND OF THE INVENTION

Field of the Invention

The field of the invention is data processing, or, more specifically, methods, apparatus, and products for capturing physical inventory in a data center.

Description of Related Art

Data centers today may include many thousands of servers installed in racks over many square feet. For purposes of component replacement, repair, airflow management, power planning, and others, physical location of servers in a data center must be identified and tracked. To identify the physical location of servers today requires a manual inventory of each server location, stored in a spreadsheet. Data entry into such spreadsheets is time-consuming and error-prone. Further, the data within such manually maintained spreadsheets can quickly become stale if equipment is moved or replaced throughout the data center.

SUMMARY OF THE INVENTION

Methods, apparatus, and products for capturing physical inventory in a data center are disclosed in this specification. Such capturing of physical inventory includes: establishing a proximity-based data communications connection with a service processor of a server, the server installed at a location within a server rack; retrieving an identifier of the server via the proximity-based data communications connection; capturing, with a camera of the mobile computing device, a digital image of the server in the server rack; identifying, from the digital image, the location of the server within the server rack; and storing the identified location of the server within the server rack in association with the retrieved identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
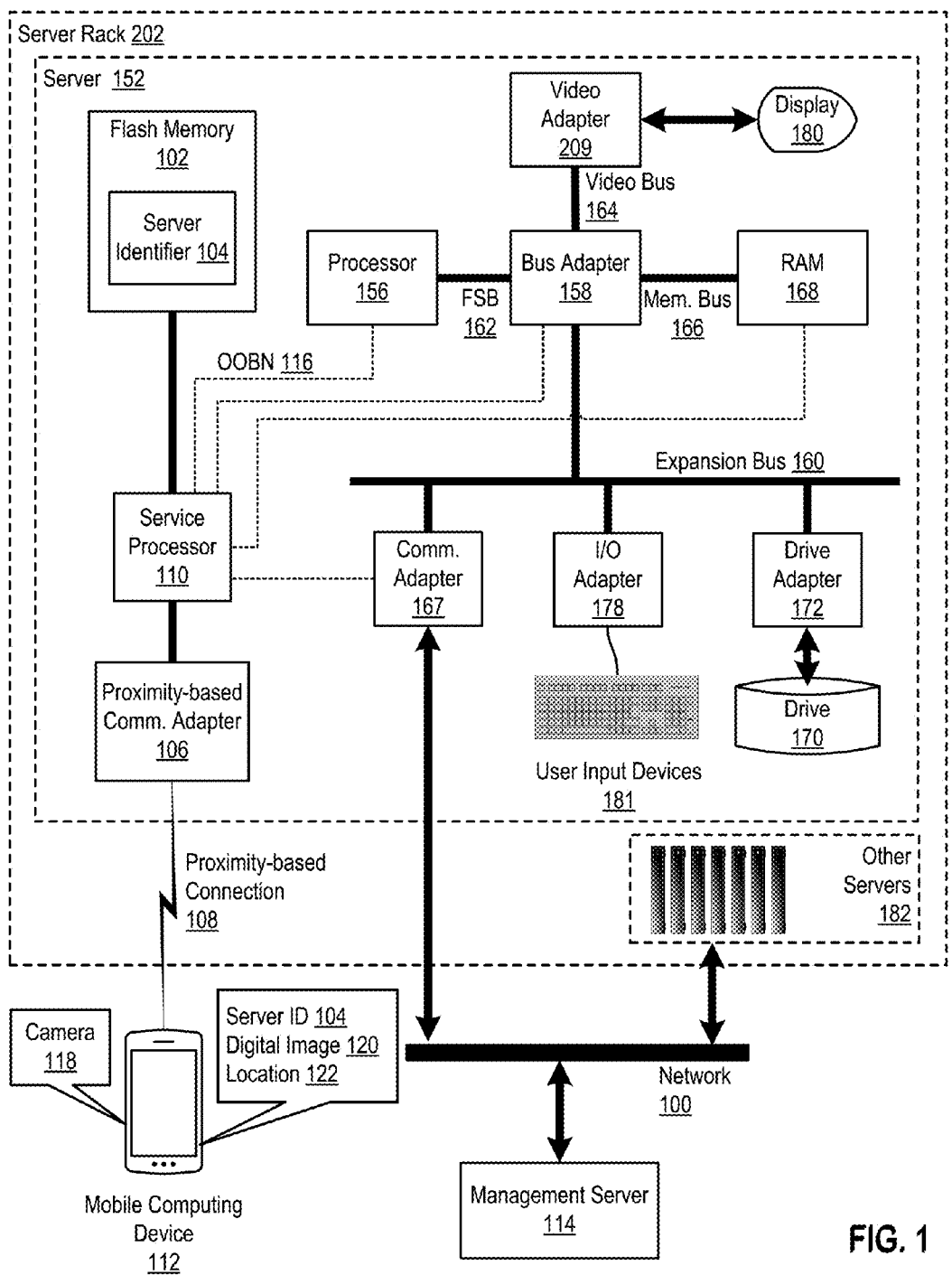
FIG. 1 sets forth a block diagram of an example system for capturing physical inventory in a data center according to embodiments of the present invention.

Exemplary methods, apparatus, and products for capturing physical inventory in a data center in accordance with the present invention are described with reference to the accompanying drawings, beginning with FIG. 1. FIG. 1 sets forth a block diagram of an example system for capturing physical inventory in a data center according to embodiments of the present invention.

The system of FIG. 1 includes several computing devices including a server (152), a mobile computing device (112), a management server (114) and other servers (182). For clarity, components of the server (152) are called out in detail. Readers of skill in the art will recognize that each of the computing devices may include similar components that operate in similar manners as the components of the server (152).

The exemplary server (152) of FIG. 1 is installed in a server rack (202) along with the other servers (182). A server rack is a standardized frame or enclosure for mounting multiple equipment modules such as servers, management modules, disk arrays, power supplies, network switches and the like. Each such module may have a front panel that is a predefined width, such as 19 inches wide, including edges or ears that protrude on each side which allow the module to be fastened to the rack frame with screws or other fasteners. Each module may be a number of 'rack units' in height. Each slot for a module may be one rack unit in height and module may be installed in the slots.

The server (152) of FIG. 1 is configured for use in a system that captures physical inventory in a data center in accordance with the present invention according to embodiments of the present invention. The server (152) of FIG. 1 includes at least one computer processor (156) or 'CPU' as well as random access memory (168) ('RAM') which is connected through a memory bus (166) and bus adapter (158) to processor (156) and to other components of the server (152).

The server (152) of FIG. 1 includes disk drive adapter (172) coupled through expansion bus (160) and bus adapter (158) to processor (156) and other components of the server (152). Disk drive adapter (172) connects non-volatile data storage to the server (152) in the form of disk drive (170). Disk drive adapters useful in computing devices configured for capturing physical inventory in a data center according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example server (152) of FIG. 1 includes a video adapter (209), which is an example of an I/O adapter specially designed for graphic output to a display device (180) such as a display screen or computer monitor. Video adapter (209) is connected to processor (156) through a video bus (164), bus adapter (158), and the front side bus (162), which may be a high speed bus.

The exemplary server (152) of FIG. 1 includes a communications adapter (167) for data communications with other servers (182) and for data communications with a data communications network (100). In the example of FIG. 1, the communications adapter is not coupled to the local area network (100) which may include a local area network or a wide area network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computing device sends data communications to another computing device, directly or through a data communications network. Examples of communications adapters useful in computing devices configured for capturing physical inventory in a data center according to embodiments of the present invention include modems for wired dial-up communications, Ethernet (IEEE 802.3) adapters for wired data communications, and 802.11 adapters for wireless data communications.

The exemplary server (152) of FIG. 1 also includes a service processor (110). A service processor (110) is a separate, dedicated internal processor typically located on the motherboard of a server, a PCI card, or on the chassis of a blade server or telecommunications platform. The service processor operates independently from the server's CPU and operating system (OS), even if the CPU or OS is locked up or otherwise inaccessible. The service processor may monitor operation of various hardware, software, and firmware resources within the computing system (152) through an out-of-band bus (116). The service processor (110) may report such monitoring to a system management server (114) through an out-of-band network. The service processor may be coupled to a different power source than other components of the server (152) so that the service processor may operate even when the main components of the server (152) are powered down.

The service processor (110) in the example of FIG. 1 is coupled to a proximity-based communications adapter (106). The proximity-based communications adapter (106) may also be coupled to a power source other than the primary power source of the main components of the computing system. In some embodiments, the proximity-based communications adapter may be coupled to the same power source as the service processor. In some embodiments, the proximity-based communications adapter (106) may be coupled to no power source at all. Instead, devices that establish a communications connection with the device may provide that power wirelessly.

The proximity-based communications adapter (106) is a communications adapter configured for wireless communications with another device typically in a point-to-point manner. The adapter is called 'proximity-based' because the wireless communications connection between the adapter and another device is only activated when that device is no more than a predefined distance from the adapter. In some embodiments, for example, the proximity-based communications adapter (106) may be implemented as a near field communications tag. Near field communication ('NFC') is the set of protocols that enables smartphones and other devices to establish radio communication with each other by touching the devices together or bringing them into proximity to a distance of typically 10 cm (3.9 in) or less. An NFC tag typically contains data (between 96 and 4,096 bytes of memory, for example). Such NFC tags may be read-only or may be rewritable.

In other embodiments, the proximity-based communications adapter (106) may be implemented as a Bluetooth™ Low Energy ('LE') device. Bluetooth LE devices enable a wireless personal area network to be established with one or more other Bluetooth LE devices. The term 'wireless personal area network' as the term is used here refers to a wireless network, operating on the IEEE 802.15 standard protocols, and typically only encompassing a very small area. The range of a wireless personal area network established utilizing Bluetooth LE devices may be configurable to be very small, less than 10 inches in some embodiments.

Other types of proximity-based communications adapters (106) may include infrared transceivers, ultrasonic transceivers, radio frequency identifier (RFID) transceivers and the like. Readers of skill in the art will recognize that any communications adapter that supports a predefined range of wireless communications, typically a very small area relative to most wireless standards, may be implemented as a proximity-based communications adapter (106) in accordance with embodiments of the present disclosure.

Also included in the example of FIG. 1, is a mobile computing device (112). A mobile computing device may be any computing system which is mobile: a mobile telephone, a handheld mobile device, a laptop, and the like. The mobile computing device (112) in the example of FIG. 1 may include many similar components as those depicted in the example server (152).

The mobile computing device (112), for example, may include RAM in which is stored a physical inventory capturing application. The physical inventory capturing application may be a module of computer program instructions that, when executed by a processor of the mobile communications device (112), establishes a proximity-based data communications connection (108) with the service processor (110) of the server (152). The server (152) is installed at a particular location, or slot, within the server rack (202).

The physical inventory capturing application may then retrieve an identifier (104) of the server via the proximity-based data communications connection. Although the server identifier (104) may be stored in flash memory or other non-volatile memory in the server of FIG. 1, readers of skill in the art will recognize that, in embodiments in which the proximity-based communications adapter (106) of the server (152) is implemented as an NFC tag, the server identifier (104) may be stored in the NFC tag itself. Retrieving that identifier, then, may include reading the contents of the NFC tag.

A server identifier as the term is used her may refer to any value that uniquely or semi-uniquely identifies the server. Examples of such server identifiers include media access control (MAC) address, serial number, model number, firmware number, some combination of these, and others as will occur to readers of skill in the art. In some embodiments, the server identifier may be stored in vital product data ('VPD') installed by the manufacturer of the server. VPD as the term is used here is a collection of configuration and informational data associated with a particular set of hardware or software. VPD includes information such as part numbers, serial numbers, media access control (MAC) addresses, and engineering change levels. VPD data may be burned onto EEPROMs associated with various hardware components, or can be queried through attached Inter-integrated Circuit (I2C) buses. VPD is sometimes utilized by firmware to determine the nature of the system hardware and to shield the operation of the firmware from minor changes and variations of hardware implementations within a given machine model number.

In addition to retrieving the server identifier, the physical inventory capturing application may also capture, with a camera (118) of the mobile computing device (112), a digital image (120) of the server (142) in the server rack (102). In some embodiments, the establishment of the proximity-based communications adapter may prompt the retrieval of the server identifier and the instantiation in the mobile device of an application for capturing digital images. Further, the application may be configured to identify the particular characteristics of the server rack and capture a digital image without a user taking any action other than holding the mobile device and aligning the camera with the location of the server in the rack.

The physical inventory capturing application may then identify, from the digital image (120), the location (122) of the server within the server rack. Such identification may be carried out in various ways. In some embodiments, the physical inventory capturing application may analyze the digital image with a set of predefined rules and, using other sensors built in to the mobile computing device such as an altimeter, calculate a height of the server's rack slot from the ground. In other embodiments, each slot may include a visible identifier, such as a barcode, that may be analyzed in the digital image by the physical inventory capturing application. Each visual identifier may encode a rack slot number. In some embodiments, in addition to the rack slot number, the visual identifier may also encode a rack identifier, building, floor, aisle, and row of the server rack.

The physical inventory capturing application may then store the identified location (122) of the server (152) within the server rack (202) in association with the retrieved identifier (104). The physical inventory capturing application may carry out this process for each server installed in the server rack (202) and compile a table of server locations for the rack. Further, the physical inventory capturing application may carry out this process for many server racks. In this way, the mobile computing device may capture physical locations of many servers throughout many racks. In some embodiments, the capture may take place at the time of installation. Consider, for example, an information technology ('IT') administrator installing a server rack with 16 servers. Prior to adding these servers to the network, the IT administrator may perform the physical location process on each of the servers in the rack. Then, the administrator may, through a data communications network (100), provide the compiled table of server identifiers and locations to the system management server (114). In other embodiments, an IT administrator may utilize the mobile computing device to capture physical locations of servers that are replacements for other servers, or that have moved, either within a rack or between racks.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
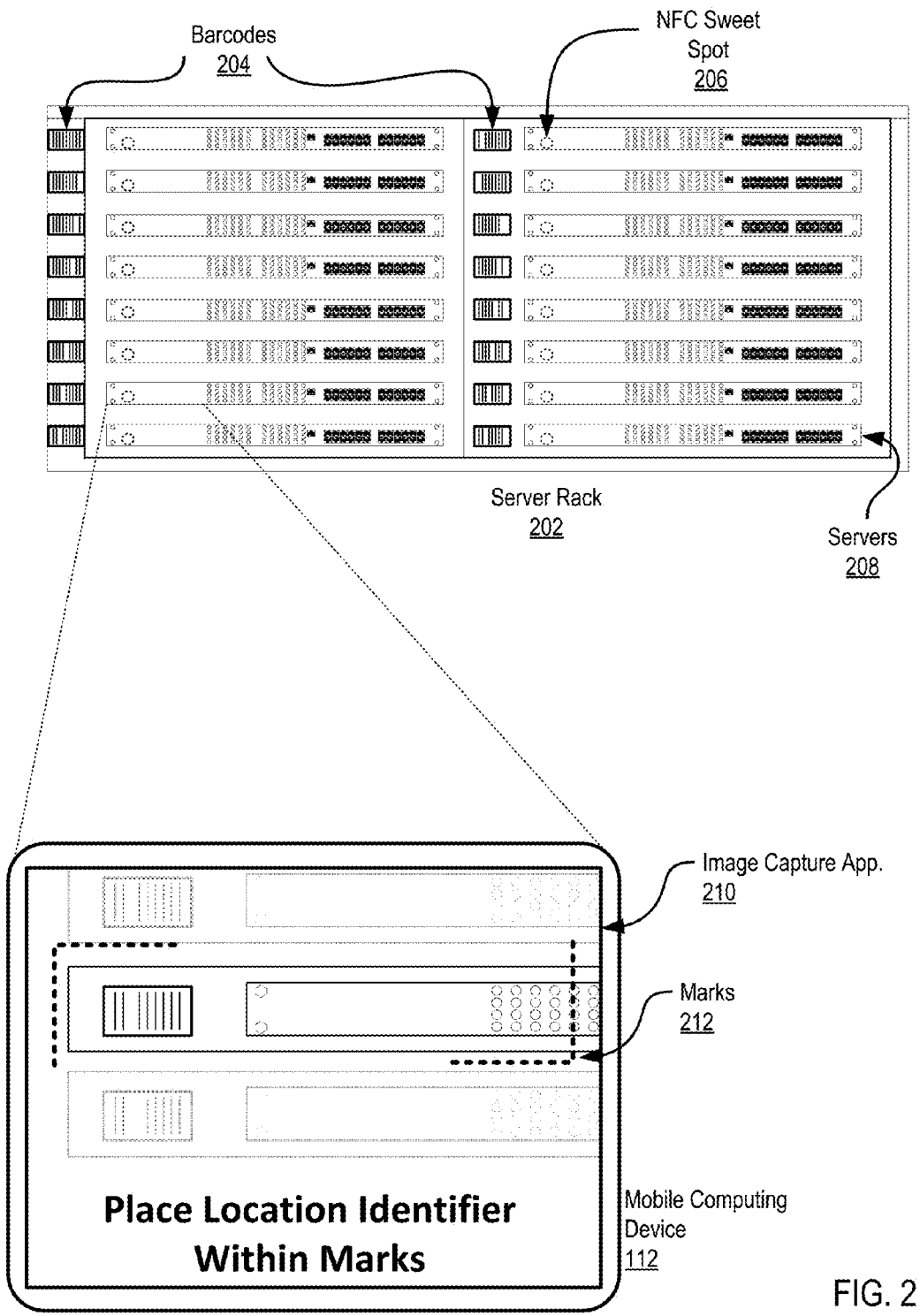
FIG. 2 sets forth a line drawing of an example server rack configured for use in a system that captures physical inventory in a data center according to embodiments of the present invention.

For further explanation, FIG. 2 sets forth a line drawing of an example server rack (202) configured for use in a system that captures physical inventory in a data center according to embodiments of the present invention. The example server rack (202) of FIG. 2 includes a number of servers (208). Each server is installed in a slot of the rack (202). Each slot is affixed with a visual identifier in the form of a barcode (204). Each barcode (204) uniquely identifies the location of the slot within the rack. In some embodiments, the barcode may encode a slot number as well as rack identifier, a building, an aisle, and a row, among other information useful for tracking physical inventory location in a data center. Such a barcode may be a linear barcode, a matrix (or '2 dimensional) barcode, or the like.

Although the visual identifier in the example of FIG. 2 is implemented as a barcode, readers of skill in the art will recognize that many different types of visual identifiers may be utilized to identify a location of a server within a rack. Various patterns of holes in the rack chassis, for example, may encode such and location identifier. Other examples of possible implementations of visual identifiers include plain text numerical identifiers which may be analyzed by optical character recognition ('OCR'), encoded patterns of color, quick response ('QR') codes, and any other optical machine-readable representation of data.

Each server (208) in the example of FIG. 2 includes an NFC tag coupled to a service processor of the server. The NFC tag is located near the lower-left corner of the bezel of the server. In this way, the 'NFC sweet spot' (206) of each server is located proximate to the barcode that identifies the physical location of the slot within which the server is installed. The 'NFC sweet spot' is the predefined area within which an NFC adapter of another device may activate the NFC tag, thus establishing a proximity-based data communications with the NFC tag.

In the example of FIG. 2, an IT administrator may touch a mobile device (112) that includes an NFC adapter on or near the NFC sweet spot of a server. Touching the sweet spot, causes the NFC adapter to activate the NFC tag of the server and establish a proximity-based data communications connection with the NFC tag and the service processor coupled to the NFC tag. The mobile device may then retrieve from the tag or the service processor VPD or other information that includes a server identifier of the tag. The establishment of the communications connection may also cause an application, such as the image capture application (210) depicted in FIG. 2, to execute. In the example of FIG. 2, the image capture application (210) includes an image overlay that instructs the user to place a location identifier (the barcode) of the server within marks that are also overlaid on top of the live view of the digital camera of the mobile device. In embodiments in which the NFC sweet spot is located near the visual identifier (barcode in this example) affixed to the rack, the user need not move the mobile computing device (112) much to place the visual identifier within the overlay marks.

The image capture application (210) may be configured to analyze the live view of the digital camera periodically, such as frame by frame, to determine whether the visual identifier is within the overlaid marks (212). Once the image capture application (210) determines that the visual identifier is within the overlaid marks (212), the application (210) may capture the digital image. The image capture application or another application may analyze the image, identify the barcode, and decode the barcode to determine location information. The application may then store that location information in a table with the previously retrieved server identification.

Because NFC data communications may be established and carried out at a high bandwidth, the process of the mobile device touching the NFC sweet spot, retrieving the server identifier, executing the image capture application, capturing the digital image with the visual identifier, and analyzing the digital image to retrieve the location information from the visual identifier may occur very quickly. To that end, an IT administrator may utilize such physical inventory capturing techniques to capture the location of many servers in a single rack very quickly. Consider, for example, that an IT administrator installs in the data center a new rack fills the rack with servers. Rather than utilizing a spreadsheet application and manually entering server identifier information along with a slot number and rack number, the IT administrator may move the mobile computing device (112) down each column of the rack, beginning at the top server and proceeding server-by-server, touching the mobile computing device (122) to the NFC sweet spot (206) and moving the device so that the visual identifier (204) may be captured.

Figure 3:
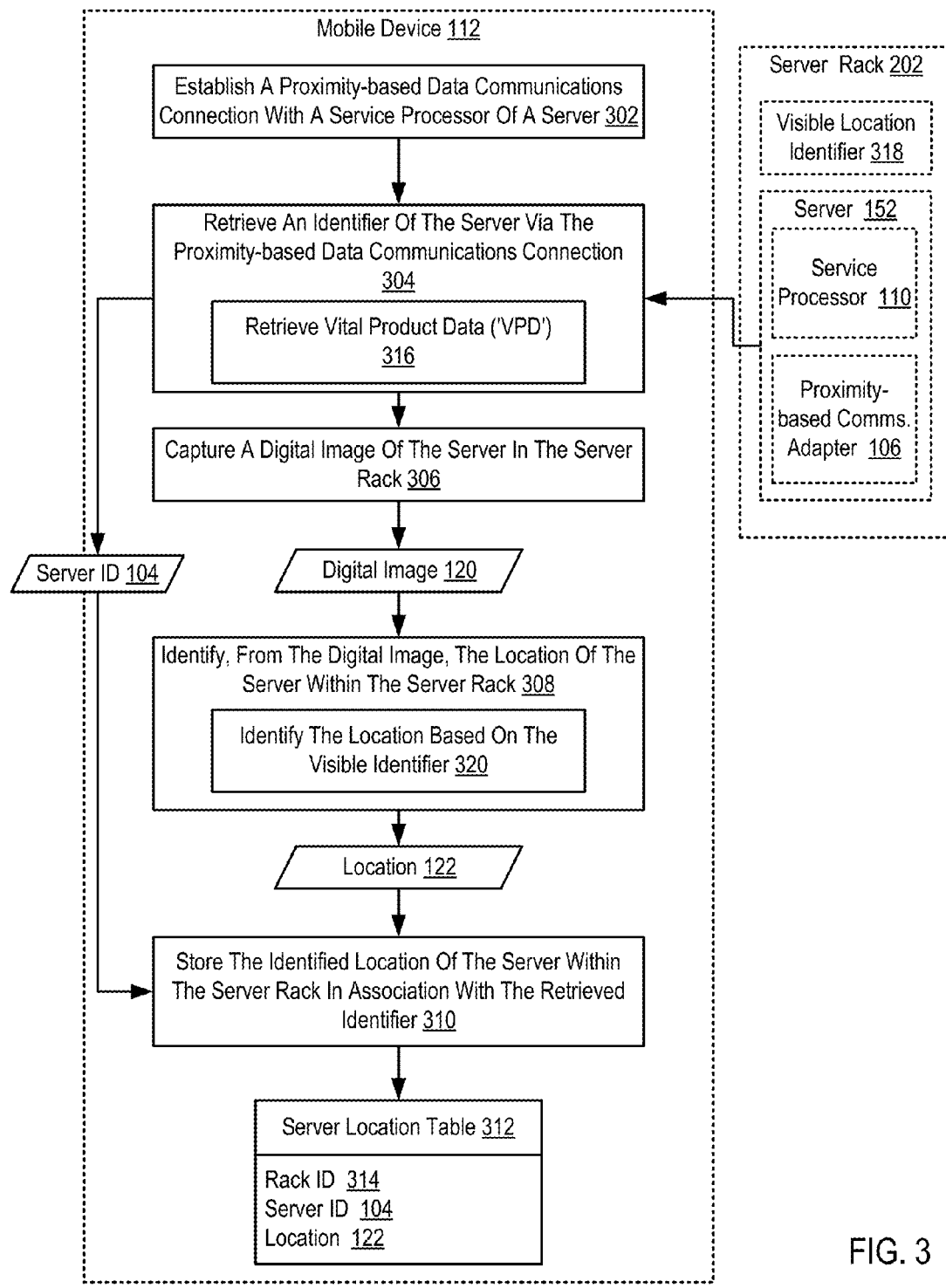
FIG. 3 sets forth a flow chart illustrating an exemplary method for capturing physical inventory in a data center according to embodiments of the present invention.

For further explanation, FIG. 3 sets forth a flow chart illustrating an exemplary method for capturing physical inventory in a data center according to embodiments of the present invention. The method of FIG. 3 includes establishing (302) a proximity-based data communications connection with a service processor (110) of a server (152). In the example of FIG. 3, the server (152) is installed at a location within a server rack (not shown on FIG. 3). Establishing (302) a proximity-based data communications connection with a service processor of a server may be carried out in various ways depending upon the type of proximity-based communications adapter (106) implemented within the server (152). In embodiments in which the server (152) includes an NFC tag, for example, the mobile device may establish a proximity-based data communications connection by moving the NFC adapter of the mobile device within a predefined range of the NFC sweet spot of the NFC tag and activating the tag.

The method of FIG. 3 also includes retrieving (304) an identifier (104) of the server via the proximity-based data communications connection. In the method of FIG. 3, retrieving (304) the identifier of the server is carried out by retrieving (316) retrieving vital product data ('VPD') from the service processor (110). Such VPD may include a machine type, a serial number, asset identification, a MAC address, and the like.

The method of FIG. 3 also includes capturing (306), with a camera of the mobile computing device, a digital image (120) of the server (152) in the server rack. Capturing (306) a digital image (120) of the server (152) in the server rack may be carried out by identifying, within a viewfinder of the digital camera of the mobile computing device, one or more predefined visual characteristics of the server or server rack and capturing the image responsive to the identification.

The method of FIG. 3 also includes identifying (308), from the digital image, the location (122) of the server within the server rack. In the method of FIG. 3, each location in the server rack (202) in which a server is installed is a slot and each slot includes a visible identifier (318). The visible identifier may be a sticker affixed near the slot, a pattern of holes near the slot, and other types of visible identifiers. The visible identifier encodes at least the slot number of the slot which the visible identifier is associated with. In other embodiments, the visible identifier encodes a rack identifier, a building, an aisle, and a row, among other types of locational information. To that end, in the method of FIG. 3, identifying (308) the location of the server within the server rack is carried out by identifying (320) the location (122) based on the visible identifier.

The method of FIG. 3 also includes storing (310) the identified location (122) of the server within the server rack in association with the retrieved identifier (122). In the method of FIG. 3, storing (310) the identified location (122) of the server within the server rack in association with the retrieved identifier (122) may be carried out by storing each association in a record of a table, such as the example server location table (312) of FIG. 3. In some embodiments, the mobile computing device (112) may also store a rack identifier (314), or other information which may identify the server's physical location, in association with the server identifier (104) and the location (122) of the server (152) within the rack.

Figure 4:
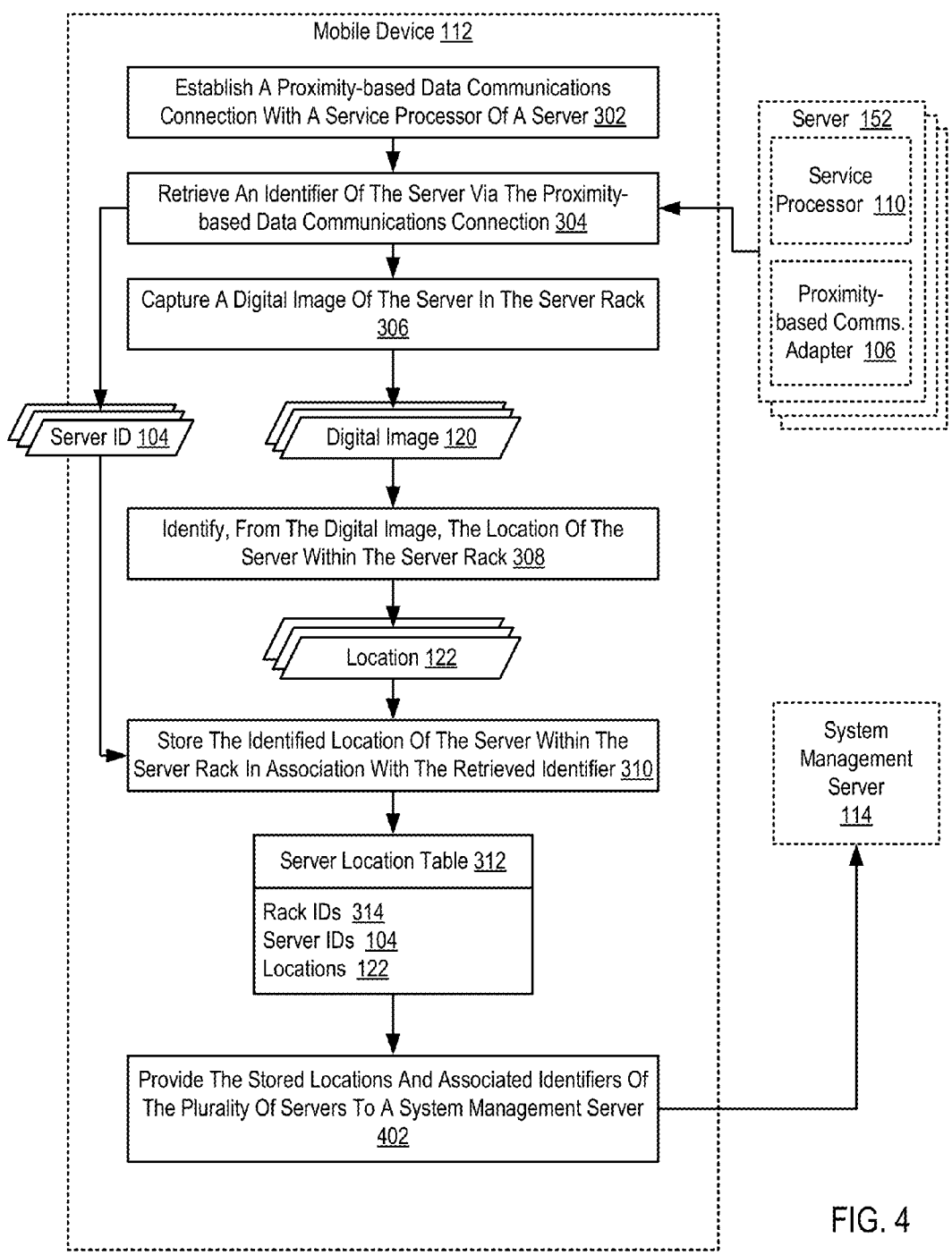
FIG. 4 sets forth a flow chart illustrating a further exemplary method for capturing physical inventory in a data center according to embodiments of the present invention.

For further explanation, FIG. 4 sets forth a flow chart illustrating a further exemplary method for capturing physical inventory in a data center according to embodiments of the present invention. The method of FIG. 4 is similar to the method of FIG. 3 in that the method of FIG. 4 also includes: establishing (302) a proximity-based data communications connection with a service processor (110) of a server (152), where the server (152) is installed at a location (122) within a server rack; retrieving (304) an identifier (104) of the server (152) via the proximity-based data communications connection; capturing (306), with a camera of the mobile computing device, a digital image (120) of the server (152) in the server rack; identifying (308), from the digital image, the location (122) of the server (152) within the server rack; and storing (310) the identified location (122) of the server (152) within the server rack in association with the retrieved identifier (104).

In the method of FIG. 4, however, the data center includes multiple server racks which in turn each include multiple servers. To that end, establishing (302) the proximity-based data communications connection, retrieving (304) the identifier of the server, capturing (306) the digital image of the server, identifying (308) the location of the server, and storing (310) the identified location (122) of the server is carried out for each of the servers installed in each of the server racks.

The method of FIG. 4 also includes providing (402) the stored locations (314, 122) and associated identifiers (104) of the servers to a system management server (114). Providing such stored locations and identifiers may be carried out by providing the example server location table (312) of FIG. 3 to the system management server (114) through in-band data communications, such as wireless data communications through a wireless LAN. The system management server (114) may receive the table and aggregate the received locations and identifiers with previously received locations and identifiers. In this way, the system management server (114) may maintain a data structure of physical location of all servers throughout the data center. Further, because the mobile computing device with the proximity-based data communications capability can be utilized to easily capture such location information of the servers, the data structure of physical location of all servers in the data center may be efficiently updated upon a move of a server, a replacement of a server, or the addition of a server or rack without relying on inefficient and error-prone manual input of data into a spreadsheet application to capture the same information.

The embodiments described in this specification may include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by first program instructions on a mobile computing device:
   establishing a proximity-based data communications connection between the mobile computing device and a service processor of a server, wherein the service processor comprises a processor separate from a primary central processing unit ("CPU") of the server, the service processor configured to monitor one or more components of the server via an out-of-band bus independently from the primary CPU of the server and an operating system of executing on the server, and including moving the mobile computing device sufficiently proximal to the server to support the establishing of the proximity-based connection, the server installed at a location within a server rack;

retrieving in the mobile computing device an identifier of the server via the proximity-based data communications connection;

capturing, in the mobile computing device with a camera of the mobile computing device, a digital image of the server in the server rack;

identifying, by the mobile computing device from the digital image, the location of the server within the server rack, wherein each location in which a server is installed comprises a slot, wherein each slot includes a visible identifier, and wherein identifying, from the digital image, the location of the server within the server rack comprises identifying, from the digital image, the location of the server within the server rack based on the visible identifier;

storing by the mobile computing device within the mobile computing device the identified location of the server within the server rack in association with the retrieved identifier; and providing the stored locations and associated identifiers of a plurality of servers to a system management server, said system management server configured to aggregate the received locations and identifiers with previously received locations and identifiers.

2. The method of claim 1 wherein establishing the proximity-based data communications connection, retrieving the identifier of the server, capturing the digital image of the server, identifying the location of the server from the digital image, and storing the identified location of the server in association with the identifier is carried out for each of the plurality of servers installed in a plurality of server racks.

3. The method of claim 1 wherein each visible identifier is a barcode that represents a slot number in the server rack.

4. The method of claim 1 wherein the proximity-based data communications connection comprises a near field communications ('NFC') data communications connection.

5. The method of claim 1 wherein retrieving an identifier of the server via the proximity-based data communications connection further comprises retrieving vital product data ('VPD').

6. A mobile computing device comprising a computer processor and a computer memory operatively coupled to the computer processor, the computer memory having disposed within it computer program instructions that, when executed by the computer processor, cause the mobile computing device to carry out the steps of:

establishing a proximity-based data communications connection between the mobile computing device and a service processor of a server, wherein the service processor comprises a processor separate from a primary central processing unit ("CPU") of the server, the service processor configured to monitor one or more components of the server via an out-of-band bus independently from the primary CPU of the server and an operating system of executing on the server, and including moving the mobile computing device sufficiently proximal to the server to support the establishing of the proximity-based connection, the server installed at a location within a server rack;

retrieving in the mobile computing device an identifier of the server via the proximity-based data communications connection;

capturing, in the mobile computing device with a camera of the mobile computing device, a digital image of the server in the server rack;

identifying, by the mobile computing device from the digital image, the location of the server within the server rack, wherein each location in which a server is installed comprises a slot, wherein each slot includes a visible identifier, and wherein identifying, from the digital image, the location of the server within the server rack comprises identifying, from the digital image, the location of the server within the server rack based on the visible identifier;

storing by the mobile computing device within the mobile computing device the identified location of the server within the server rack in association with the retrieved identifier; and providing the stored locations and associated identifiers of a plurality of servers to a system management server, said system management server configured to aggregate the received locations and identifiers with previously received locations and identifiers.

7. The mobile computing device of claim 6 wherein establishing the proximity-based data communications connection, retrieving the identifier of the server, capturing the digital image of the server, identifying the location of the server from the digital image, and storing the identified location of the server in association with the identifier is carried out for each of the plurality of servers installed in a plurality of server racks.

8. The mobile computing device of claim 6 wherein each visible identifier is a barcode that represents a slot number in the server rack.

9. The mobile computing device of claim 6 wherein the proximity-based data communications connection comprises a near field communications ('NFC') data communications connection.

10. The mobile computing device of claim 6 wherein retrieving an identifier of the server via the proximity-based data communications connection further comprises retrieving vital product data ('VPD').

11. A computer program product disposed upon a non-transitory computer readable storage medium, wherein the computer readable storage medium is not a signal, the computer program product comprising computer program instructions that, when executed, cause a mobile computing device to carry out the steps of:

establishing a proximity-based data communications connection between the mobile computing device and a service processor of a server, wherein the service processor comprises a processor separate from a primary central processing unit ("CPU") of the server, the service processor configured to monitor one or more components of the server via an out-of-band bus independently from the primary CPU of the server and an operating system of executing on the server, and including moving the mobile computing device sufficiently proximal to the server to support the establishing of the proximity-based connection, the server installed at a location within a server rack;

retrieving in the mobile computing device an identifier of the server via the proximity-based data communications connection;

capturing, in the mobile computing device with a camera of the mobile computing device, a digital image of the server in the server rack;

identifying, by the mobile computing device from the digital image, the location of the server within the server rack, wherein each location in which a server is installed comprises a slot, wherein each slot includes a visible identifier, and wherein identifying, from the digital image, the location of the server within the server rack comprises identifying, from the digital image, the location of the server within the server rack based on the visible identifier;

storing by the mobile computing device within the mobile computing device the identified location of the server within the server rack in association with the retrieved identifier; and providing the stored locations and associated identifiers of a plurality of servers to a system management server, said system management server configured to aggregate the received locations and identifiers with previously received locations and identifiers.

12. The computer program product of claim 11 wherein establishing the proximity-based data communications connection, retrieving the identifier of the server, capturing the digital image of the server, identifying the location of the server from the digital image, and storing the identified location of the server in association with the identifier is carried out for each of the plurality of servers installed in a plurality of server racks.

13. The computer program product of claim 11 wherein each visible identifier is a barcode that represents a slot number in the server rack.

14. The computer program product of claim 11 wherein the proximity-based data communications connection comprises a near field communications ('NFC') data communications connection.

15. The computer program product of claim 11 wherein retrieving an identifier of the server via the proximity-based data communications connection further comprises retrieving vital product data ('VPD').

* * * * *